Figure 6:
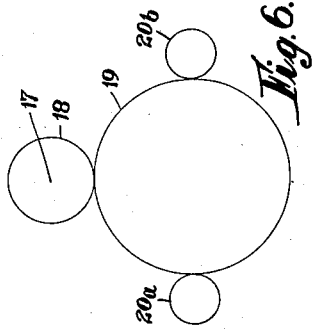

Dec. 3, 1940.   H. SINCLAIR   2,223,535
VARIABLE-SPEED POWER-TRANSMISSION MECHANISM
Filed Aug. 6, 1938   3 Sheets—Sheet 1

Inventor
Harold Sinclair
by
Dinn Fairbank & Hirsch

Dec. 3, 1940. H. SINCLAIR 2,223,535
VARIABLE-SPEED POWER-TRANSMISSION MECHANISM
Filed Aug. 6, 1938 3 Sheets-Sheet 2

Inventor
Harold Sinclair
by
Dunn Fairbank & Hirsch

Dec. 3, 1940. H. SINCLAIR 2,223,535
VARIABLE-SPEED POWER-TRANSMISSION MECHANISM
Filed Aug. 6, 1938 3 Sheets-Sheet 3

Inventor
Harold Sinclair
by
Dean Fairbank & Hirsch

Patented Dec. 3, 1940

2,223,535

UNITED STATES PATENT OFFICE 2,223,535

VARIABLE-SPEED POWER-TRANSMISSION MECHANISM

Harold Sinclair, Kensington, London, England

Application August 6, 1938, Serial No. 223,392
In Great Britain March 3, 1938

5 Claims. (Cl. 192—47)

This invention relates to a controllable freewheel coupling device suitable for use in variable-speed power transmission mechanism, the coupling device being a modification of the synchronising coupling described in Patent No. 1,862,188 of Norton Legge.

An object of this invention is to provide a free-wheel coupling having control means whereby it can be rendered bi-directionally free and alternatively capable of operating as a free wheel adapted to transmit torque in one sense and to over-run under torque in the opposite sense, the coupling being so balked that it is incapable of being changed from its first, bi-directionally free condition to its second, free-wheeling condition while its driving part is being rotated relatively to its driven part under the influence of a torque acting in said first-mentioned sense. That is to say, it cannot be changed to the condition in which it can transmit torque under circumstances such that this change would effect an abrupt stoppage of relative rotation of its driving and driven parts.

The improved coupling is particularly suitable for use, in power-transmission mechanism providing alternative paths of different speed ratios, as a clutch device by which a higher-speed ratio of such mechanism is selected.

In changing from a lower- to a higher-speed gear with such improved mechanism, the control member of the higher-speed coupling, which was in its first condition while the lower-speed gear was engaged, is urged into the second (free-wheeling) position, the driving shaft is retarded, and the lower-speed gear is disengaged. As long as the ratio of the speeds of the driving and driven shafts is higher than that of the gear to be engaged, the higher-speed coupling remains balked in its first condition, though biased towards its second condition. As soon as the speed of the driving shaft has been retarded to such an extent that the ratio of the speeds of the driving and driven shafts begins to get lower than the ratio of the gear to be engaged, the coupling of this gear becomes unbalked and assumes its second condition. The driving shaft is now accelerated to engage the higher-speed gear without shock through the action of the free-wheel coupling.

Figure 1:
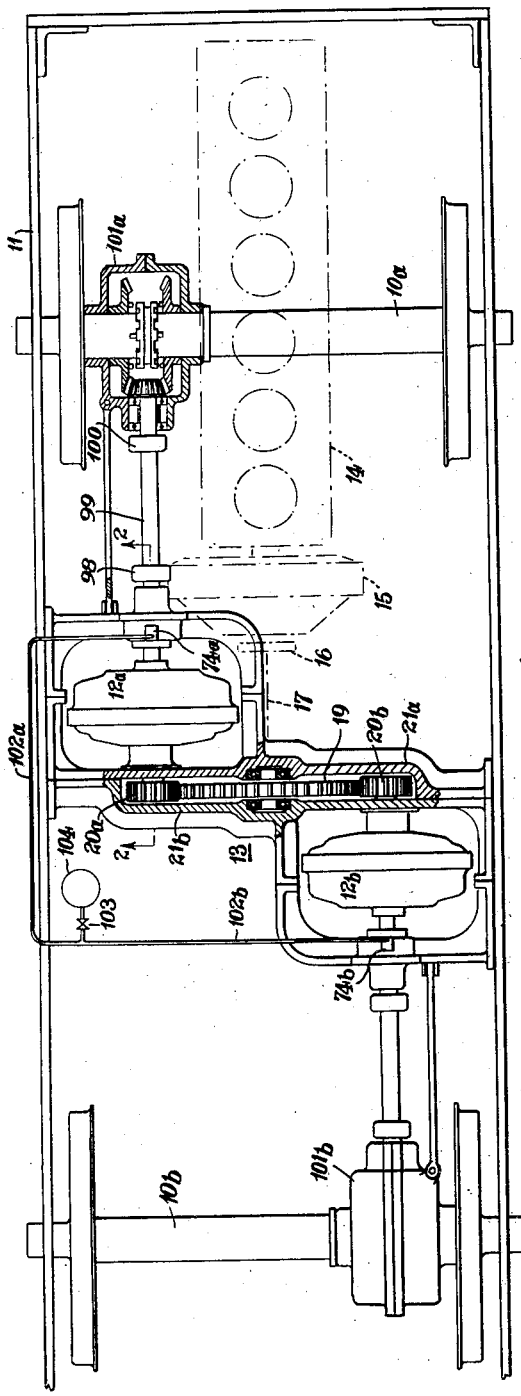
Figure 2:
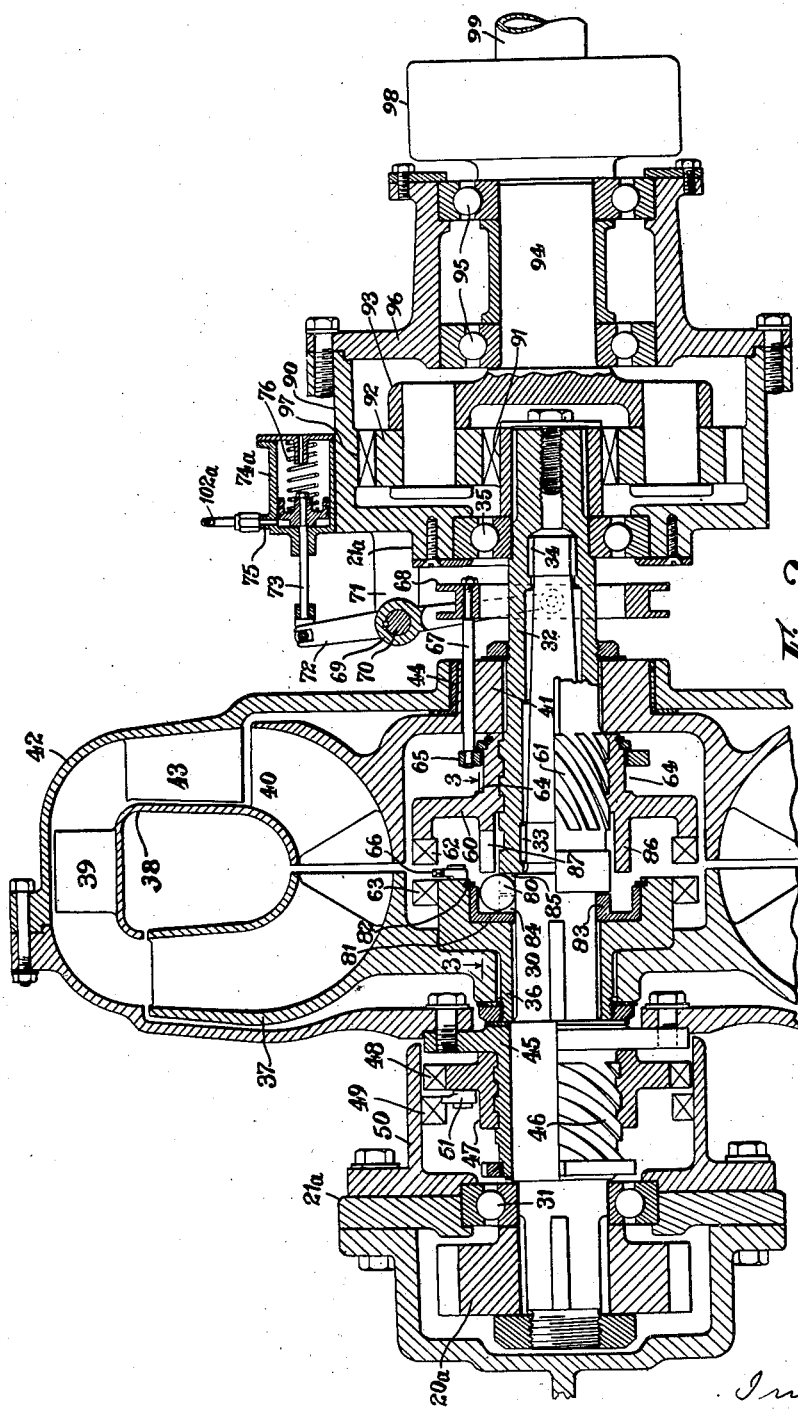
Figure 3:
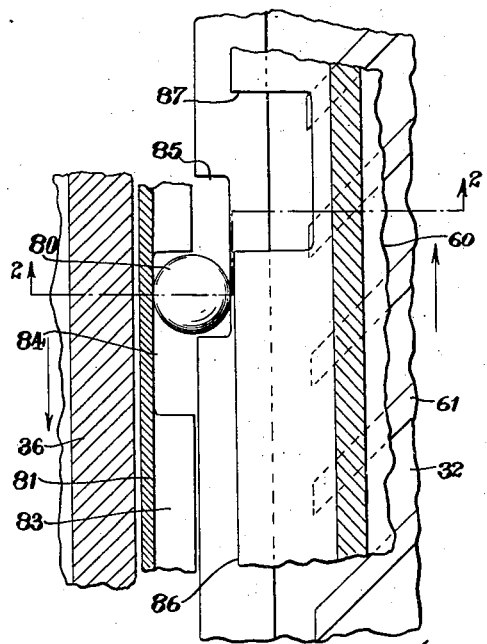
Figure 5:
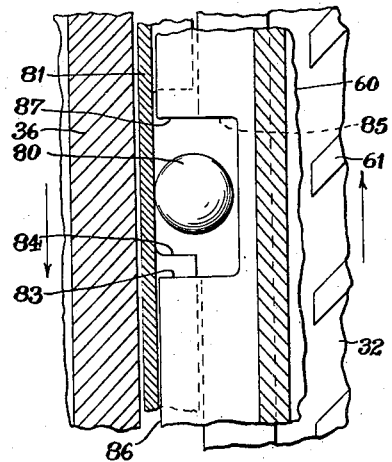
Figure 4:
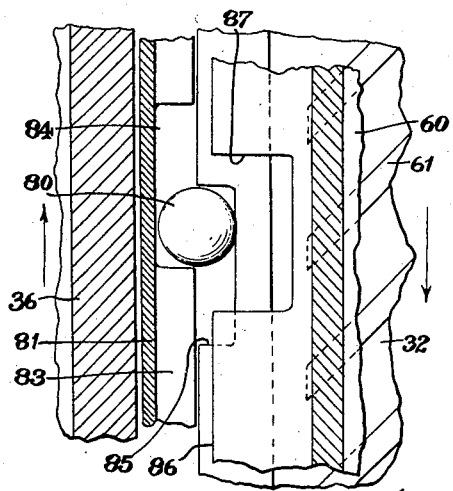
Figure 7:
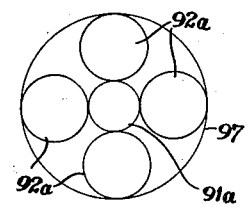
Figure 8:
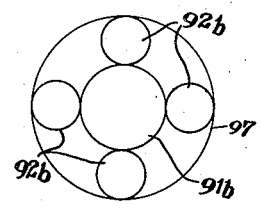

Embodiments of the invention, as applied by way of example to a railroad locomotive vehicle, will be described with reference to the accompanying diagrammatic drawings, in which:

Fig. 1 is a plan view of a power bogie with certain parts of the transmission mechanism in section, portions of the bogie not relevant to this invention being omitted, Fig. 2 is a sectional side elevation on the line 2—2 in Figs. 1 and 3, Fig. 3 is a developed section on the line 3—3 in Fig. 2, Figs. 4 and 5 correspond to Fig. 3, but show different configurations, Fig. 6 is a diagram of distribution gearing, as seen from the left of Fig. 1, Figs. 7 and 8 are diagrams of reduction gearing, employed in a modification of the system shown in Figs. 1 to 6, and Fig. 9 is a diagram of control mechanism.

The power bogie shown in Fig. 1 has two driving axles 10a and 10b mounted in a frame 11 by suspension means (not shown) of known kind. These axles are drivably connected through respective turbo gears 12a and 12b and distributing gearing, generally denoted by 13, to an internal-combustion engine which is placed above the axle 10a and is indicated by chain-dotted lines at 14. The engine, with which may be associated a hydraulic coupling 15 of the kinetic type having a controllable clutch stop 16 of known type, is connected by a shaft 17 to a driving pinion 18 (Fig. 6) of the gearing 13. The pinion 18 meshes with an idler wheel 19 which in turn meshes with pinions 20a and 20b, which are directly connected respectively to the input shafts of the turbo gears 12a and 12b. The pinions 20a and 20b are equal in diameter and are preferably smaller than the driving pinion 18, so that the turbo gear input shafts run faster than the engine shaft 17. The gearing 13 is disposed in a casing formed by two frame castings 21a and 21b which also support the turbo gears respectively.

Since these two turbo gears are generally similar, only the gear 12a will be described in detail. Referring to Fig. 2, the input shaft 30 is journalled at 31 in the frame member 21a. A hollow output shaft 32 is journalled on the shaft 30 by two needle roller bearings 33 and 34 and is supported in the frame member 21a by a bearing 35. A drum 36 is fixed to the input shaft 30 and to it is fixed the impeller 37 of a hydraulic torque-increasing gear of known kinetic type. The turbine 38 of the gear has two stages of blading 39 and 40 and includes a boss 41 fixed to the output shaft 32. The turbo gear also includes a two-part fluid-tight casing 42 provided with reaction blading 43. The casing is journalled at 44 on the hub 41 of the turbine and is fixed to a sleeve 45 journalled on the input shaft and forming part of a free-wheel coupling of the Legge type which prevents the casing from rotating backwards. The sleeve 45 is provided with left-handed helical splines 46 with which is engaged a corresponding spline-threaded nut 47 having radial teeth 48 adapted to engage between teeth 49 formed on the interior of a sleeve 50 which is fixed to the frame member 21a. One or more outwardly biased pawls 51 mounted on the nut 47 click over the teeth 49 when the casing 42 is rotated forwards. When this casing tends to rotate backwards, the ends of these pawls abut against the teeth 49 and cause the nut 48 to be moved helically on the sleeve 45. Since the pawls are positioned on the nut so as to locate the gaps between the teeth 48 exactly in register with the teeth 49, the teeth 48 accordingly intermesh cleanly with the teeth 49 and the casing is thereby prevented from rotating further backward. If now the casing begins to rotate forwards, the nut 47 merely returns automatically to the position shown. The casing 42 is kept full of working liquid, and means for maintaining a suitably high fluid pressure in the working circuit when it is in operation are provided in known manner as well as means for maintaining a circulation of liquid between the turbo circuit and a cooler. These are omitted from Fig. 2.

The balked synchro-coupling adapted to provide a direct mechanical connection between the shafts 30 and 32 includes a nut 60 engaged with left-handed helical splines 61 of steep pitch on the shaft 32. The nut 60 has teeth 62 engageable with teeth 63 on the drum 36 fixed to the input shaft, and a groove 64 accommodating a striking ring 65 having an axial backlash in the groove. The drum 36 is provided with one or more outwardly biased pawls 66 having their noses facing in the direction of rotation of the drum and normally projecting slightly in advance of the leading faces of the teeth 63 that are adjacent thereto. The striking ring 65 is fixed to a plurality of rods 67 slidably fitted in holes in the turbine boss 41 and in turn fixed to a grooved actuating ring 68. A control yoke 69, mounted on a shaft 70 journalled in fixed brackets such as 71, is provided with a lever 72 engaged by the piston rod 73 of a fluid-pressure servo motor 74a having a fluid inlet port 75 and a spring 76 which tends to keep the parts in the configuration shown.

The balking device includes a ball 80 retained against the shaft 30 by a channel section ring 81 which is rotatable in the counterbore of the drum 36, being retained by a circlip 82. The inner flange 83 of the ring has a depth and thickness equal to the radius of the ball 80 which is located with circumferential play in a gap 84 in this flange (Fig. 3.) The ball is also located with circumferential play in a gap 85 in the end of the shaft 32. The axial and radial dimensions of the gap 85 equal the radius of the ball. The nut 60 has a tubular extension 86 adapted to engage the outer half of the ball and provided with a gap 87 adapted to receive this half of the ball.

The output shaft 32 of the turbo gear drives a planetary speed-reducing gear contained within a casing 90 (Fig. 2). A sun wheel 91 is fixed to the output shaft 32 and meshes with planet wheels 92 journalled on a planet carrier 93 which is integral with a shaft 94. A casing cover 96 carries bearings 95 supporting the shaft 94. The planet wheels mesh with a toothed annulus 97 formed in the fixed casing.

The shaft 94 is coupled by a universal joint 98, a propeller shaft 99 and a universal joint 100 (Fig. 1) to a bevel reversing gear 101a of known type arranged to drive the axle 10a. The turbo gear 12b is provided with a planetary reduction gear which is similar to that of the turbo gear 12a, and which drives the axle 10b through a bevel reversing gear 101b.

The servo-motors 74a and 74b of the turbo gears (Fig. 1) are connected by pipes 102a and 102b through a control valve 103 to a source of fluid pressure 104.

The system operates as follows. The locomotive being stationary with the reversing gears 101a and 101b in neutral and the control valve 103 closed so that the direct-drive synchro-couplings of the turbo gears are both bi-directionally free, the engine 14 is started, and the transmission system runs idly. To set the locomotive in motion, the transmission system is arrested by the clutch stop 16, the reversing gears are engaged to give the desired direction of running, and the clutch stop is released. When the engine is accelerated, the turbines of the two turbo gears are set in rotation by the liquid and the two axles are driven on low speed.

To change to high speed, the control valve 103 is opened causing both the servo-motors 74a and 74b to be energized and the striking rings 65 (Fig. 2) to be moved towards the input ends of the turbo gears. Since both turbo gears operate identically, only the sequence of operations in the gear 12a will be described. As the input shaft 30 is rotating faster than the output shaft 32, if the synchro-coupling were suddenly changed to its free-wheel condition, a severe shock would occur owing to the resulting sudden positive equalization of the speeds of these members. This action is prevented by the balking means provided. The arrows in Fig. 3 show the direction of relative rotation of the input and output shafts during driving on bottom gear. Thus the ring 81 will be held, by the drag of the fluid film between it and the drum 36, in the position shown in Fig. 3 with reference to the output shaft 32, and the ball 80, being held by the gaps 84 and 85 out of register with the gap 87, will prevent the nut 60 from being moved to the left. The synchro-coupling thus remains in its bi-directionally free condition.

The engine 14 is now retarded until the input shaft 30 begins to lag behind the output shaft 32, as shown in Fig. 4. Reversal of relative rotation causes the ball 80 to be rolled, by the effect of the fluid drag, to the other ends of the gaps 84 and 85 into register with the gap 87 of the nut, which is thereby allowed to move helically on the splines 61, under the influence of the servo-motor 74a, into the free-wheel position in which the teeth 62 are in register with the pawls 66. The engine is again accelerated, and, when the input shaft tends to rotate faster than the output shaft, the pawls 66 engage the trailing faces of the teeth 62 and constrain the nut to move helically on the splines 61 to bring the teeth 62 into engagement with the teeth 63 without clashing, the backlash of the striking ring 65 in the groove 64 permitting such movement.

The engine thus drives the axles 10a and 10b through the mechanical synchro-couplings of the turbo gears 12a and 12b, yielding high speed. Under these conditions the casings 42 of the turbo gears rotate idly in a forward direction so that losses due to the working liquid are eliminated.

If one of the axles runs slightly slower than the other, the drive will be transmitted positively to only the axle that is rotating more slowly, the faster running axle free-wheeling, so that there is no risk of continuous slight skidding.

Although the invention has been particularly illustrated with reference to a multi-ratio gear system in which the lower-speed path is through a hydraulic torque-converter, it will be evident that the invention is equally applicable to systems employing other kinds of power transmitting paths.

The system shown in Figs. 1 to 6 may be modified as follows to yield three speeds. The planetary speed-reducing gear of the turbo gear 12a, shown diagrammatically in Fig. 7, is arranged to give a speed reduction of say 4.5 to 1. The corresponding planetary gear of the turbo gear 12b is similar to that of the turbo gear 12a, but, as shown in Fig. 8, has a larger sun wheel 91b and smaller planet wheels 92b, so that it effects a smaller reduction in speed. A ratio of 3.2 to 1 is convenient.

Figure 9:
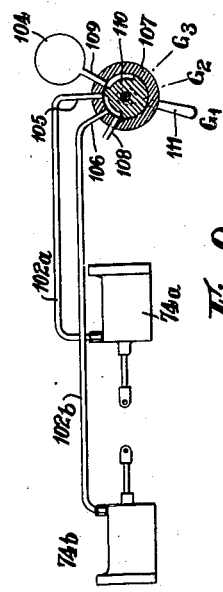

The gear-changing control mechanism is shown in Fig. 9. The servo-motor supply pipes 102a and 102b are connected to ports 105 and 106 in a valve body 107 which is also provided with an exhaust port 108 and an inlet port 109 communicating with the fluid pressure source 104. A rotary valve 110 fixed to a control member 111 is movable between three positions denoted by G1, G2 and G3.

Low speed is obtained as hereinbefore described, the control member 111 being in position G1 so that both servo-motors are de-energized; and as on low speed the turbine of the gear 12a rotates faster than the turbine of the gear 12b, owing to the different ratios of the planetary reduction gears, the blading of the two turbo converters may differ so as to enable them to run more satisfactorily in parallel under these conditions.

To change to second speed the control member 111 is moved to position G2 so as to energize the servo-motor 74a and the engine 14 is retarded and accelerated. Direct mechanical drive is established only through the turbo-gear 12a yielding second speed. Under these conditions the ratio of the speeds of the input and the output shafts of the turbo gear 12b are 4.5/3.2, that is, such that its torque transmission ratio is about 1 to 1.

To change to high speed, the control member 111 is moved to position G3 so as to energize also the servo-motor 74b of the turbo gear 12b, and thereafter the direct mechanical drive through this gear is established by a sequence of operations identical with that for the change from bottom to middle speed. Under these conditions the turbine 38 of the gear 12a will be running faster than the impeller. The over-running torque thus imposed on the axle 10a is not serious enough to render essential the emptying of the circuit of the gear 12a in a vehicle required to start and stop at short intervals. Likewise the losses in the converter 12b when running in the second-speed condition are not sufficient to render it necessary to make the turbo circuit of the gear 12b inoperative. If desired however to eliminate these small losses—for example in vehicles running on express services, the known means already referred to for delivering liquid to the turbo circuits of converters 12a and 12b may be arranged so that either of the said circuits may be partially or completely emptied at times when the other gear is in direct drive. Such filling and emptying of the turbo circuits may take place slowly since the change of gear is effected quickly by the direct mechanical connection 62, 63 in any event.

In place of the ball type of balking device shown in Figs. 2 to 5, any other suitable types of balking devices may be used.

While it is preferred to control the balked synchro-coupling by causing the nut to move helically on the second member so as to render the pawls operative and inoperative at will, nevertheless other constructions whereby the driving and driven members are caused to move axially relatively to each other will yield an equivalent controlling effect.

I claim:

1. In a variable-speed power-transmission mechanism, a controllable balked free-wheel coupling comprising a toothed first member, a second member rotatable relatively to said first member, an intermediate member so mounted on said second member as to be constrained to move helically thereon in consequence of relative rotation between said intermediate and second members, said intermediate member having teeth engageable with the teeth of said first member, a subsidiary ratchet drive capable of coupling said first and intermediate members and effecting engagement of the teeth of said first and intermediate members without clashing on relative angular displacement of said first and second members in one sense, a control member operable for relatively displacing said first member and said intermediate member, at least in part axially, from a disengaged position in which said subsidiary ratchet drive is inoperative and the coupling is bi-directionally free to an engaged position in which said subsidiary ratchet drive is operative and the coupling is in free-wheeling condition and balking means which serve to prevent relative axial displacement of said first and intermediate members out of their relative position in which the coupling is bi-directionally free, so long as there is relative rotation of said first and second members in the above-mentioned sense.

2. In a variable-speed power-transmission mechanism, a controllable balked free-wheel coupling comprising a toothed first member, a second member rotatable relatively to said first member, an intermediate member so mounted on said second member as to be constrained to move helically thereon in consequence of relative rotation between said intermediate and second members, said intermediate member having teeth engageable with the teeth of said first member, a pawl on one of said toothed members engageable with teeth on the other of said toothed members and so positioned as to effect engagement of said toothed members without clashing on relative angular displacement of said first and second members in one sense, a control member operable for relatively displacing said first member and said intermediate member, at least in part axially, from a disengaged position in which said pawl is out of the path of the teeth with which it co-operates and the coupling is bi-directionally free to an engaged position in which said pawl is in the path of the teeth with which it co-operates and the coupling is in free-wheeling condition, and balking means which serve to prevent relative axial displacement of said first and intermediate members out of their relative position in which the coupling is bi-directionally free, so long as there is relative rotation of said first and second members in the above-mentioned sense.

3. In a variable-speed power-transmission mechanism, a controllable balked free-wheel coupling comprising a toothed first member, a second member rotatable relatively to said first member, an intermediate member so mounted on said second member as to be constrained to move helically thereon in consequence of relative rotation between said intermediate and second members, said intermediate member having teeth engageable with the teeth of said first member, a pawl on one of said toothed members engageable with teeth on the other of said toothed members and so positioned as to effect engagement of said toothed members without clashing on relative angular displacement of said first and second members in one sense, control means operable for displacing said intermediate member along said second member from a disengaged position in which said pawl is out of the path of the teeth with which it co-operates to an engaged position in which said pawl is in the path of said last-mentioned teeth, said control means permitting further displacement of said intermediate member to a driving position in which it is in mesh with the teeth of said first member, and balking means which serve to prevent relative axial displacement of said first and intermediate members out of their relative position in which the coupling is bi-directionally free, so long as there is relative rotation of said first and second members in the above-mentioned sense.

4. In a variable-speed power-transmission mechanism, a controllable balked free-wheel coupling comprising a toothed first member, a second member rotatable relatively to said first member, an intermediate member so mounted on said second member as to be constrained to move helically thereon in consequence of relative rotation between said intermediate and second members, said intermediate member having teeth engageable with the teeth of said first member, a pawl on one of said toothed members engageable with teeth on the other of said toothed members and so positioned as to effect engagement of said toothed members without clashing on relative angular displacement of said first and second members in one sense, control means operable for displacing said intermediate member along said second member from a disengaged position in which said pawl is out of the path of the teeth with which it co-operates to an engaged position in which said pawl is in the path of said last-mentioned teeth, said control means permitting further displacement of said intermediate member to a driving position in which it is in mesh with the teeth of said first member, a balking member carried by and capable of angular displacement around said first member, means fixed to said second member and engaging said balking member with angular backlash, and means on said intermediate member positioned to abut said balking member axially when there is relative rotation of said first and second members in the said sense and to clear said balking member axially when said relative rotation is reversed.

5. In a variable-speed power-transmission mechanism, a controllable balked free-wheel coupling comprising a toothed first member, a second member rotatable relatively to said first member, an intermediate member so mounted on said second member as to be constrained to move helically thereon in consequence of relative rotation between said intermediate and second members, said intermediate member having teeth engageable with the teeth of said first member, a pawl on one of said toothed members engageable with teeth on the other of said toothed members and so positioned as to effect engagement of said toothed members without clashing on relative angular displacement of said first and second members in one sense, control means operable for displacing said intermediate member along said second member from a disengaged position in which said pawl is out of the path of the teeth with which it co-operates to an engaged position in which said pawl is in the path of said last-mentioned teeth, said control means permitting further displacement of said intermediate member to a driving position in which it is in mesh with the teeth of said first member, a cage frictionally engaged with said first member, a rolling element mounted in and capable of limited angular displacement around said cage, means fixed to said second member and engaging said rolling element with angular backlash, and a projection on said intermediate member positioned to abut said rolling element axially when said first and second members rotate relatively to each other in the said sense and to clear said rolling element axially when said relative rotation is reversed.

HAROLD SINCLAIR.